(12) United States Patent
Dean et al.

(10) Patent No.: US 6,891,319 B2
(45) Date of Patent: May 10, 2005

(54) FIELD EMISSION DISPLAY AND METHODS OF FORMING A FIELD EMISSION DISPLAY

(75) Inventors: Kenneth Andrew Dean, Phoenix, AZ (US); Bernard F. Coll, Fountain Hills, AZ (US); Albert Alec Talin, Scottsdale, AZ (US); Paul A. Von Allmen, Mesa, AZ (US); Yi Wei, Chandler, AZ (US); Adam Madison Rawlett, Chandler, AZ (US); Matthew Stainer, Goleta, CA (US)

(73) Assignee: Motorola, Inc., Schaumburg, IL (US)

( * ) Notice: Subject to any disclaimer, the term of this patent is extended or adjusted under 35 U.S.C. 154(b) by 160 days.

(21) Appl. No.: 09/942,451

(22) Filed: Aug. 29, 2001

(65) Prior Publication Data

US 2003/0042834 A1 Mar. 6, 2003

(51) Int. Cl.[7] .............. H01J 1/02; H01J 1/16; H01J 19/10
(52) U.S. Cl. .............. 313/309; 313/336; 313/351; 313/346 R
(58) Field of Search .............. 313/309, 336, 313/351, 346 R

(56) References Cited

U.S. PATENT DOCUMENTS

| | | | |
|---|---|---|---|
| 5,717,287 A | 2/1998 | Amrine et al. | 313/495 |
| 5,726,524 A | 3/1998 | Debe | 313/309 |
| 5,726,529 A | 3/1998 | Dean et al. | 313/495 |
| 5,773,921 A | 6/1998 | Keesmann et al. | |
| 5,773,927 A | 6/1998 | Zimlich | 313/495 |
| 5,872,422 A | 2/1999 | Xu et al. | 313/311 |
| 5,973,444 A | 10/1999 | Xu et al. | 313/309 |
| 6,019,656 A | 2/2000 | Park et al. | 445/24 |
| 6,059,627 A | 5/2000 | Dean et al. | 445/24 |
| 6,062,931 A | 5/2000 | Chuang et al. | 445/24 |
| 6,100,628 A | 8/2000 | Coll et al. | 313/310 |
| 6,146,230 A | 11/2000 | Kim et al. | 445/51 |
| 6,159,538 A | 12/2000 | Rodriguez et al. | |
| 6,278,231 B1 * | 8/2001 | Iwasaki et al. | 313/310 |
| 6,514,113 B1 * | 2/2003 | Lee et al. | 313/495 |

FOREIGN PATENT DOCUMENTS

| | | |
|---|---|---|
| EP | 0 840 344 A1 | 5/1998 |
| EP | 1 061 041 A1 | 12/2000 |
| WO | WO 00/73203 A1 | 12/2000 |

OTHER PUBLICATIONS

Kind et al., "Printing gel–like catalysts for the directed growth of multiwall carbon nanotubes," American Chemical Society, 2000, pp. 6877–6883.

Xu et al., "A method for fabricating large–area, patterned, carbon nanotube field emitters," Applied Physics Letters, vol. 74, No. 17, Apr. 26, 1999, pp. 2549–2551.

Fan et al., "Self–oriented regular arrays of carbon nanotubes and their field emission properties," Science, vol. 283, Jan. 22, 1999, pp. 512–514.

(Continued)

Primary Examiner—Ashok Patel
Assistant Examiner—Sharlene Leurig
(74) Attorney, Agent, or Firm—William E. Koch

(57) ABSTRACT

A field emission device and method of forming a field emission device are provided in accordance with the present invention. The field emission device is comprised of a substrate (12) having a deformation temperature that is less than about six hundred and fifty degrees Celsius and a nano-supported catalyst (22) formed on the substrate (12) that has active catalytic particles that are less than about five hundred nanometers. The field emission device is also comprised of a nanotube (24) that is catalytically formed in situ on the nano-supported catalyst (22), which has a diameter that is less than about twenty nanometers.

15 Claims, 4 Drawing Sheets

OTHER PUBLICATIONS

Suh et al, "Highly ordered two-dimensional carbon nanotube arrays," Applied Physics Letters, vol. 75, No. 14, Oct. 4, 1999, pp. 2047–2049.

Hernadi et al. "Catalytic synthesis of carbon nanotubes using zeolite support," Zeolites 17, 1996, pp. 416–423.

Murakami et al., "Field emission from well-aligned, patterned, carbon nanotube emitters," Applied Physics Letters, vol. 76, No. 13, Mar. 27, 2000, pp. 1776–1778.

Ma et al., "Polymerized carbon nanobells and their field-emission properties," Applied Physics Letters, vol. 75, No. 20, Nov. 15, 1999, pp. 3105–3107.

Li et al, "Highly-ordered carbon nanotube arrays for electronics applications," Applied Physics Letters, vol. 75, No. 3, Jul. 19, 1999, pp. 367–369.

Terrones et al., "Controlled production of aligned-nanotube bundles," Nature, vol. 388, Jul. 3, 1997, pp. 52–55.

Xu et al., "Controlling growth and field emission property of aligned carbon nanotubes on porous silicon substrates," Applied Physics Letters, vol. 75, No. 4, Jul. 26, 1999, pp. 481–483.

Tsai et al., "Bias-enhanced nucleation and growth of the aligned carbon nanotubes with open ends under mircowave plasma synthesis," Applied Physics Letters, vol. 24, No. 23, Jun. 7, 1999, pp. 3462–3464.

Kind et al., "Patterned films of nanotubes using microcontact printing of catalysts," Advanced Materials, 11, No. 15, 1999, pp. 1285–1289.

Nilsson et al., "Scanning field emission from patterned carbon nanotube films." Applied Physics Letters, vol. 76. No. 15, Apr. 10, 2000, pp. 2071–2073.

Kuttel et al, "Electron field emission from phase pure nanotube films growth in a methane/hydrogen plasma," Applied Physics Letters, vol. 73, No. 15, Oct. 12, 1998, pp. 2113–2115.

Ren et al., "Synthesis of large arrays of well-aligned carbon nanotubes on glass," Science, vol. 282 Nov. 6, 1998, pp. 1105–1107.

Ren et al. "Growth of a single freestanding multiwall carbon nanotube on each nanonickel dot," Applied Physics Letters, vol 75, No. 8 Aug. 23, 1999, pp. 1086–1088.

Pan et al., "Very long carbon nanotubes," Nature, vol. 394, Aug. 13, 1998, pp. 631–632.

Zhang et al., "A flat panel display device fabricated by using carbon nanotubes cathode," IEEE, 2001, pp. 193–194.

Zhong et al., "Large-scale well aligned carbon nitride nanotube films: Low temperature growth and electron field emission," Journal of Applied Physics, vol. 89, No. 11, Jun. 1, 2001, pp. 5939–5943.

Kim et al., "Growth and field emission of carbon nanotubes on electroplated Ni catalyst coated on glass substrates," Journal of Applied Physics, vol. 90, Sep. 1, 2001, pp. 2591–2594.

Gulyaev et al., "Field emitter arrays on nanotube carbon structure films," J. Vac.Sci. Technol. B 13(2), Mar./Apr. 1995, pp. 435–436.

Chernozatonskii, et al. "Nanotube carbon structure tips—a source of high field emission of electrons," Mat. Res.Soc. Symp. Proc., vol. 359. 1995 Materials Research Society, pp. 99–104.

Su et al., "A scalable CVD method for the synthesis of single-walled carbon nanotubes with high catalyst productivity," Chemical Physics Letters 322, (2000), pp 321–326.

Li et al. "Large-scale synthesis of aligned carbon nanotubes," Science, vol. 274, Dec. 6, 1996, pp. 1701–1703.

Cassell et al. "Large scale CVD synthesis of single-walled carbon nanotubes," J. Phys. Chem. B. 1999, 103, pp. 6484–6492.

Cassell et al. "Directed growth of free-standing single walled carbon nanotubes," J. Am. Chem. Soc. 1999, 121, pp. 7975–7976.

Cassell et al, "Combinatorial optimization of heterogeneous catalysts used in the growth of carbon nanotubes," Langmuir 20001, 17, pp. 260–264.

Li et al, "Large-scale synthesis of aligned carbon nanotubes," Science, vol. 274, Dec. 6, 1996, pp. 1701–1703.

\* cited by examiner

US 6,891,319 B2

FIELD EMISSION DISPLAY AND METHODS OF FORMING A FIELD EMISSION DISPLAY

FIELD OF THE INVENTION

The present invention generally relates to a field emission device, and more particularly to a field emission display and methods of forming a field emission display (FED).

BACKGROUND OF THE INVENTION

A nanotube, and more specifically a carbon nanotube, is known to be useful for providing electron emission in field emission devices, such as cold cathodes that are used in a field emission display. The use of a carbon nanotube as an electron emitter has reduced the cost of a field emission device, including the cost of a field emission display. The reduction in cost of the field emission display has been obtained with the carbon nanotube replacing other electron emitters (e.g., a Spindt tip), which generally have higher fabrication costs as compared to a carbon nanotube based electron emitter.

The manufacturing costs for a field emission display that uses a carbon nanotube can be further reduced if the carbon nanotube is grown on the field emission substrate from a catalytic surface using chemical vapor deposition or other film deposition techniques. Nanotube growth can be done as a subsequent deposition process preventing the degradation of the electron emitter properties by other device processing techniques or steps (e.g., wet processes). To further reduce costs for a field emission display, it is also desirable to construct the field emission substrate from materials such as borosilicate glass or sodalime glass. However, borosilicate glass and sodalime glass cannot generally tolerate temperatures above about sixty hundred and fifty degrees Celsius (650° C.) and the tolerance of borosilicate glass and sodalime glass is further reduced if the borosilicate glass or sodalime glass is subjected to temperatures above about sixty hundred and fifty degrees Celsius (650° C.) for an extended period or forces are applied to the borosilicate glass or sodalime glass at about such temperatures. To even further reduce costs, it is desirable to use low switching voltage driver electronics in a field emission display. However, a field emission display using carbon nanotubes generally have a higher switching voltage than what can be provided by these low switching voltage driver electronics.

In view of the foregoing, it is desirable to provide low gate voltage field emission display that uses low switching voltage driver electronics, carbon nanotubes as electron emitters and a field emission substrate that has a deformation temperature below about six hundred and fifty degrees Celsius (650° C.). Furthermore, additional desirable features will become apparent to one skilled in the art from the drawings, foregoing background of the invention and following detailed description of a preferred exemplary embodiment, and appended claims.

BRIEF DESCRIPTION OF THE DRAWINGS

The present invention will hereinafter be described in conjunction with the appended drawing figures, wherein like numerals denote like elements, and.

DETAILED DESCRIPTION OF THE DRAWINGS

The following detailed description of preferred embodiments is merely exemplary in nature and is not intended to limit the invention or the application and uses of the invention. Furthermore, there is no intention to be bound by any theory presented in the preceding background of the invention or the following detailed description of preferred embodiments.

Figure 1:
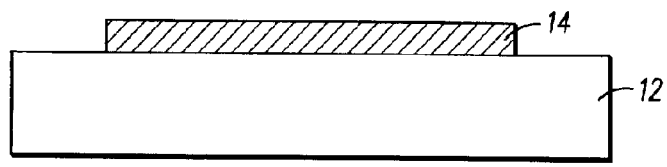
FIGS. 1–11 are sectional, top plan and isometric views illustrating the method of forming cathodes according to a preferred exemplary embodiment of the present invention.

FIGS. 1–11 illustrate a method of forming a cathode that can be used to construct a field emission display (FED) according to a preferred exemplary embodiment of the present invention. Referring to FIG. 1, the formation of the cathode begins with providing a field emission substrate 12. The field emission substrate 12 has a deformation temperature below about six hundred and fifty degrees Celsius (650° C.) and is preferably borosilicate glass or sodalime glass, however any number of materials can be used for the field emission substrate 12 according to the present invention. For example, the field emission substrate 12 can be other glasses, silicon, carbon, ceramics, metals, and composite materials. If the field emission substrate 12 is a semiconductor material and control electronics has been integrated into the display, an insulating layer or multiple insulating layers are preferable to reduce capacitance within the FED.

Figure 2:
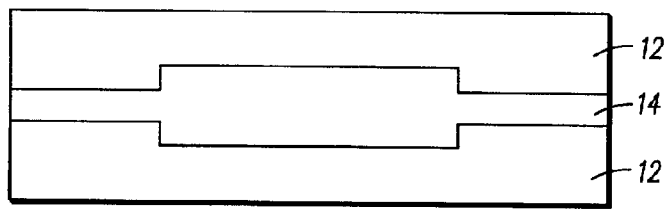

A conductive layer 14 is deposited with any number of deposition techniques on the field emission substrate 12 and patterned by standard photolithographic methods. Generally, the conductive layer 14 includes a metal, such as titanium, tungsten, chromium, molybdenum, copper, or the like, that will adhere to the field emission substrate 12 and support the formation of a nano-supported catalyst layer 22 as will be subsequently discussed in this detailed description of the drawings. As can be appreciated by one of ordinary skill in the art, the thickness 15 of the conductive layer 14 is a function of the desired application. As can be seen in FIG. 2, which provides a top plan-view of FIG. 1, the conductive layer 14 is preferably formed into an elongated strip with an expanded portion defining an emitter area. The elongated strip provides external electrical connections to the emitters (i.e., nanotubes formed in the emitter area).

Figure 3:
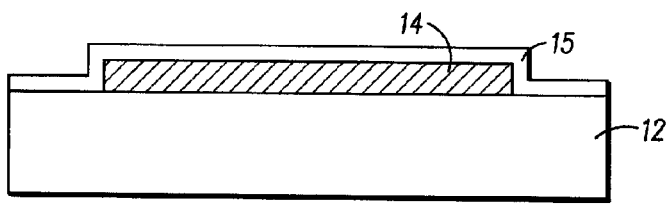

Referring to FIG. 3, a bleed layer 15 can be optionally deposited over the conductive layer 14 and extended outwardly on the surface of the field emission substrate 12 beyond the conductive layer 14 and into contact with a metal gate 86 as subsequently described and illustrated with reference to FIG. 9. The bleed layer 15 is preferably formed of a material having a resistance that is preferably greater than approximately $1 \times 10^{11}$ ohms, such as tantalum nitride (TaN), chromium oxy-nitride ($CrO_xN_y$, where x=y equals 1) or the like, to allow charge accumulated during operation to bleed off so as to minimize an undesirable surface potential. Additional information on bleed layers can be found in U.S. Pat. No. 5,760,535, entitled "Field Emission Device," issued Jun. 2, 1998, which is hereby incorporated by reference.

The thickness 16 of the bleed layer 15 is preferably less than about one hundred (100) angstroms to about eight hundred (800) angstroms in order to minimize the affect on the lateral flow of current from the conductive layer 14. Moreover, the relatively high resistance of the material forming the bleed layer 15 provides minimal current flow between the emitters (i.e., nanotubes 24) in the emitter area and the respective gate within the cathode. In order to maintain simplicity and clarity in this detailed description of the drawings, the bleed layer 15 is considered to be a portion or sub layer of the conductive layer 14 if the bleed layer 15 is present.

Figure 4:
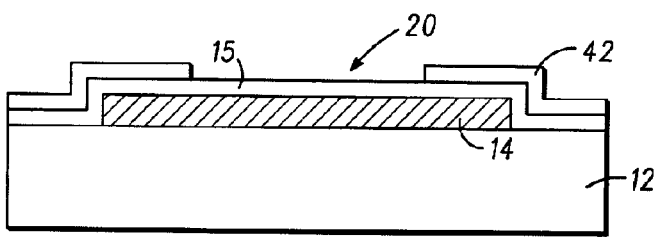

Referring to FIG. 4, a sacrificial layer 42 is deposited so as to define an emitter well 20. One or more of the dimensions (i.e., diameter 19, depth 21 etc.) of the emitter well 20 can be adjusted for the particular application. In this detailed description of the drawings, the emitter well 20 has a diameter 19 of about forty (40) microns and a depth 21 of about twelve (12) microns. The sacrificial layer 42 is preferably formed of photo-resist, but could be silicon-on-glass (SOG), a polyimide (PI), a Q-pac, or the like. The material used for the sacrificial layer 42 is preferably selected such that the deposition, patterning, selective removal and cleaning processes associated with the sacrificial layer 42 during the formation of the emitter well 20 does not substantially remove or operably harm the conductive layer 14 and/or the bleed layer 15.

Figure 5:
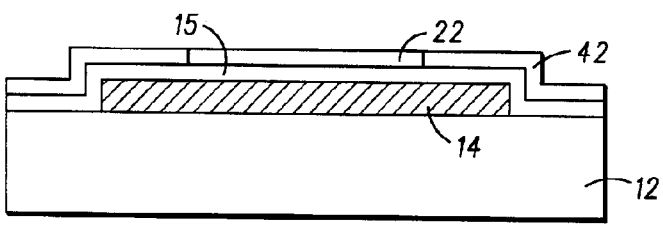

Referring to FIG. 5, the nano-supported catalyst layer 22 is formed within the emitter well 20 illustrated in FIG. 4. In one preferred embodiment, the nano-supported catalyst layer 22 is formed with a method that begins with immersing the emitter well 20 illustrated in FIG. 4 in a solvent having a first metal salt and a second metal salt. Any number of soluble metal salts can be used for the first metal salt and the second metal salt as long as the first metal salt and the second metal salt react to form an insoluble metal, metal hydroxide, metal oxide or the like.

For example, the first metal salt can be aluminum nitrate, magnesium nitrate, calcium nitrate or combination thereof, and the second metal salt can be a metal nitrate or sulfate containing iron, nickel, cobalt, ruthenium, rhodium, palladium, rhenium, osmium, iridium, platinum, or a combination thereof. The first and second metal salts are at least partially dissolved in any number of solvents, including, but not limited to, water, alcohol or a combination of water and alcohol (e.g., methanol, ethanol, and isopropyl alcohol). Additional compounds such as particles, surfactants, etc. can also be incorporated into the solvent.

The immersion of the emitter well 20 illustrated in FIG. 4 into the solvent having the first metal salt and the second metal salt can be accomplished with numerous immersion techniques, including, but not limited to, spin immersion, spray immersion, dip coating immersion, ink jet spraying followed by electrolysis or the like. Once the emitter well is immersed into the solvent having the first metal salt and the second metal salt, a bias voltage is applied to the emitter well such that the nano-supported catalyst layer 22 is at least partially formed of the first metal and the second metal salt within the emitter well. The application of the bias voltage is preferably applied with a biasing source connected to the emitter well and a counter electrode of the biasing source immersed in the solvent.

Alternatively, the nano-supported catalyst layer 22 can be formed by a second method, which begins with immersing the emitter well 20 illustrated in FIG. 4 into a first solvent containing a first metal salt. While the emitter well is immersed in the solvent containing the first metal salt, a bias voltage is applied from a counter electrode to the emitter well such that the nano-supported catalyst layer 22 is at least partly formed with the first metal salt. The emitter well with the partial formation of the nano-supported catalyst layer 22 is removed from the first solvent containing the first metal salt, and immersed into a second solvent containing a second metal salt. A bias voltage is applied from a counter electrode to the emitter well such that the nano-supported catalyst layer 22 is partially formed with the second metal salt.

The second method for formation of the nano-supported catalyst layer 22 can use numerous materials, combinations of materials, solvents, metal salts, and metal salt concentrations in the solvents including the materials, combinations of materials, solvents, metal salts, and metal salt concentrations in the solvent that were discussed above with reference to the first method for formation of the nano-supported catalyst layer 22. For specific examples of the first method and the second method for formation of the nano-supported catalyst layer 22, see Appendix 1. However, the examples set forth in Appendix 1 should not be construed as limiting embodiments of the present invention.

Unlike other conventional catalysts formed by electro-deposition, which generally have active catalytic particles with a dimension that is greater than about one micron (1 $\mu$m) (i.e., diameter, width, length, or depth), the nano-supported catalyst layer 22 formed according to the two previously described methods has active catalytic particles derived from the second metal salt (e.g., iron, nickel, cobalt, ruthenium, rhodium, palladium, rhenium, osmium, iridium, or platinum, or a combination thereof) with a dimension that is about one-tenth of a nanometer (0.1 nm) to about five hundred nanometers (500 nm). According to the present invention, the dimension of the active catalytic particle is preferably less than fifty nanometers (50 nm), more preferably less than ten nanometers (10 nm), even more preferably less than three nanometers (3 nm), and most preferably less than one nanometer (1 nm), and supported by the metal oxide derived from the first metal salt (e.g., the alumina, magnesium oxide, calcium oxide).

Altering the composition ratio between the second metal salt and the remaining materials deposited to form the nano-supported catalyst can control the density of the active catalytic particles. The nano-support provided by the metal oxide support maintains the nano-scale dimensions of the active catalytic particles through the useful temperature of the catalytic process including the chemical reaction process subsequently described in this detailed description of the drawings for growing nanotubes and prevents the active catalytic particles from coalescing during such a catalytic process. This nano-support renders the particle size relatively independent of the thickness of the nano-supported catalyst layer 22 and temperature cycle. Furthermore, the metal oxide support can minimize diffusion of poisons to the nano-supported catalyst layer 22 and can enhance chemical reactivity. Due to the nano-supported structure, the nano-supported catalyst layer 22 has a high surface area and a high surface area to volume ratio.

Figure 6:
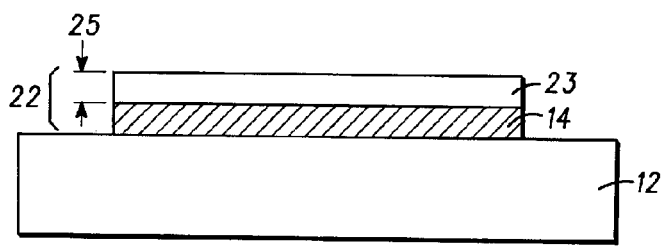

The nano-supported catalyst layer can also be formed according to a third method of the present invention. Referring to FIG. 6, the method begins with substantially the same or the same steps as previously described in this detailed description of the drawings. More specifically, the method begins with providing a field emission substrate 12 and depositing and patterning a conductive layer 14 onto the field emission substrate 12. However, the third method of the present invention also includes the deposition of at least two metallic elements to form a mixed metal alloy layer.

The deposition of the two metallic elements to form the mixed metal alloy layer 23 can be achieved in any number of conventional techniques such as co-evaporation, co-sputtering, electro-deposition, laser ablation, or arc evaporation. The mixed metal alloy layer 23 is preferably comprised at least two metallic elements that are generally dispersed uniformly. The first metallic element is preferably an active catalytic metallic element. The second metallic element is preferably a structural metallic element that maintains the nano-scale dimensions of the nano-supported catalyst layer through the useful temperature of the catalytic process (e.g., about five hundred degrees Celsius (500° C.) to about one thousand degrees Celsius (1,000° C.) for hot filament chemical vapor deposition (HFCVD)), and assists in preventing the active catalytic metallic element from coalescing during such process.

It is preferred that the structural metallic element be a metal oxide. The active catalytic metallic element and the structural catalytic metallic element preferably have different electrochemical selectivity thereby permitting the selective dissolution of the structural metallic element during a subsequent etching process. Examples of a suitable active catalytic metallic element include titanium, vanadium, chromium, manganese, copper, zirconium, niobium, molybdenum, silver, hafnium, tantalum, tungsten, rhenium, gold; and preferably, ruthenium, rhodium, palladium, osmium, iridium, platinum; and more preferably iron, cobalt, nickel, or a combination thereof. Examples of a suitable structural metallic element include, without limitation, silicon, magnesium, and preferably aluminum. The concentration or composition of the active catalytic metallic element and the structural metallic element is controlled by the deposition conditions of each of the metallic elements such as electrical discharge, partial pressure, temperature, and evaporation rate.

The composition of mixed metal alloy layer 23 influences the final structure and determines the activity of the nano-supported catalyst for cracking the hydrocarbon gas (e.g., methane) during HFCVD. The preferred composition of layer contains at least fifty percent (50%) of the active catalytic metallic element. The thickness 25 of the mixed metal alloy layer 23 is a function of the desired application for the nano-supported catalyst layer. In some catalytic applications, the thickness 25 of the mixed metal alloy layer 23 can reach a few microns. However, for growing carbon nanotubes to be used in the FED, the nano-supported catalyst layer preferably has a thickness that is less than about one micron, more preferably less than about two hundred nanometers (200 nm), even more preferably less than one hundred and fifty nanometers (150 nm), and most preferably less than about one hundred nanometers (100 nm).

In a preferred exemplary embodiment, the deposition of the active catalytic metallic element and the structural metallic element is achieved by co-evaporation. The co-evaporation process begins with the introduction of the substrate into a vacuum environment. The vacuum environment is preferably less than about $1 \times 10^{-6}$ Torr and can be created with any number of devices, including, but not limited, to a vacuum chamber. The active catalytic metallic element and the structural metallic element are co-evaporated to form the mixed metal alloy layer. The coevaporation of the active catalytic metallic element and the structural metallic element can be performed using any number of conventional apparatuses and methods.

In another preferred exemplary embodiment of the present invention, an additional element can be deposited to promote better catalytic activity of the nano-supported catalyst layer. More specifically, the additional element is deposited with the active catalytic metallic element and the structural metallic element to form the mixed metal alloy layer. Examples of a suitable additional element include, without limitation, calcium, tantalum, hafnium, and zirconium.

After the formation of the mixed metal alloy layer 23, the first sacrificial layer 42 is deposited to define each of the emitter wells as illustrated in FIG. 4. After the first sacrificial layer has been deposited and patterned to define the emitter wells as illustrated in FIG. 4, the mixed metal alloy layer 23 is etched so that it remains primarily on the emitter wells (i.e., the electrodes). Once the mixed metal alloy layer 23 is etched so that it remains primarily on the emitter wells, the method continues with the removal of the first sacrificial layer.

Continuing with reference to FIG. 6, after the removal of the first sacrificial layer, the remaining mixed metal alloy layer 23 is etched to at least partially remove and selectively oxidize the structural metallic element to form the nano-supported catalyst layer 22. The etchant preferably targets the structural metallic element having the electrochemically active element of the mixed metal alloy layer 23. Any number of dry or wet etch techniques can be used to etch the mixed metal alloy layer 23 and the etchant, etchant concentration and etch time are preferably selected to provide the partial removal and selective ioxidization of the structural metallic element. The etching can be achieved by immersing (e.g., spinning, spraying, dip coating, etc.) the mixed metal alloy layer 23 in an etching solution, preferably for approximately thirty (30) seconds to approximately forty (40) minutes, more preferably for approximately five (5) minutes to approximately fifteen (15) minutes. Examples of suitable etching solution include, without limitation, $NH_4OH$, an alkali metal hydroxide (e.g., NaOH, KOH), and an acid (e.g., nitric acid, hydrochloric acid).

The partial removal and selective oxidation of the structural metallic element by the etchant is created by a kinetic roughening transition. This roughening transition results from a competition between a roughening process (i.e., removal of the structural metallic element) and a smoothing process (i.e., surface diffusion, volume diffusion, or dissolution/re-deposition). For the mixed metal alloy layer 23 below a critical alloying composition (e.g., containing at least fifty percent (50%) of the active catalytic metallic element), the structural metallic element is removed from the first few surface atomic sub-layers of mixed metal alloy layer 23 resulting in an enrichment of the active catalytic metallic element in the sub-layers and the slowing of the dissolution process. Above a critical alloying composition, the dissolution rate of the structural metallic element is great enough to develop a nano-porous support structure following the predefined interconnected channels of the structural metallic element within the mixed metal alloy layer 23, the structural metallic element composition is approximately greater than the percolation threshold. The dissolution process continues to follow these pathways as the smoothing process results in the coarsening of the three-dimensional structure in an attempt to minimize the overall surface energy. The coarsening allows for further penetration of the electrolyte into the mixed metal alloy layer 23.

Figure 7:
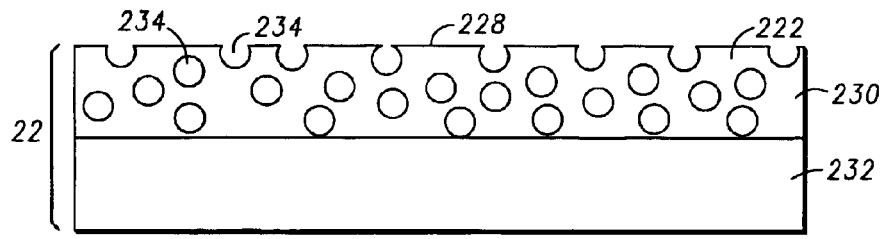

Referring to FIG. 7, the nano-supported catalyst layer 22 resulting from the etching of the mixed metal alloy layer has a porous (or sponge like) sub-layer 230 in electrical contact with a mixed metal alloy sub-layer 232. The porous sub-layer 230 is comprised of dispersed active catalytic metallic element particles 222 (e.g., about one million nano-particles per $cm^2$ to about ten billion nano-particles per $cm^2$) supported by a metal oxide structure 228 derived from the structural metallic element and filled with nano-pores 234 and tunnel structures (not shown) that are interconnected and random in direction. The porous sub-layer 230 is formed as the etching chemically drives the active catalytic metallic element atoms to aggregate into clusters by a phase separation process at the solid-electrolyte interface, and increased the surface area to volume ratio of mixed metal alloy layer. Substantially unaffected by the etching, the composition of mixed metal alloy sub-layer 232 is substantially the same or the same as the mixed metal alloy layer.

Unlike other conventional catalysts which generally have active catalytic metallic element particles that are greater than approximately one micron (1 μm), the nano-supported catalyst layer 22 resulting from the etching of the mixed metal alloy layer has active catalytic metallic element particles 222 that are about one-tenth of a nanometer (0.1 nm) to about five hundred nanometers (500 nm), preferably less than about fifty nanometers (50 nm), more preferably less than about ten nanometers (10 nm), even more preferably less than about seven nanometers (7 nm), and most preferably less than three nanometers (3 nm). The nano-pores 234 are generally irregular in shape and size. The size and distribution of the nano-pores 234 are dependent upon the electrolyte composition and concentration, composition of the mixed metal alloy layer, etchant concentration and the etching rate and period.

The nano-support provided by the metal oxide structure maintains the nano-scale dimensions of the active catalytic metallic element particles 222 through the useful temperature of the catalytic process including the chemical process that can be used for growing nanotubes (e.g., HFCVD) subsequently discussed in this detailed description of the drawings and prevents the active catalytic metallic element particles 222 from coalescing during such process. The nano-support renders the particle size of the active catalytic metallic element 222 relatively independent of the thickness and temperature cycle of the nano-supported catalyst layer 22. Furthermore, the metal oxide structure can prevent diffusion of contaminants to the nano-supported catalyst layer 22 and can improve the chemical reactivity. Due to its nano-supported porous structure, nano-supported catalyst layer 22 resulting from the etching of the mixed metal alloy layer has a relatively high surface area to volume ratio, preferably greater than about fifty meter square per gram (50 $m^2/g$), more preferably greater than about one hundred square per gram (100 $m^2/g$), and most preferably greater than one hundred and fifty meter square per gram (150 $m^2/g$). After etching the mixed metal alloy layer 220, the nano-supported catalyst layer 22 is preferably dried according to the present invention. The drying process can be accomplished with any conventional method. For example, the drying process can be airflow over the nano-supported catalyst layer 22. For a specific example of the formation of the nano-supported catalyst layer 22 with the method of the third preferred embodiment of the present invention, see Appendix 1. However, this example set forth in Appendix 1 should not be construed as limiting embodiments of the present invention. For example, see Example V of appendix 1 for a method of nanotube preparation other than the first, second and third embodiments of nanotube preparation previously described in this detailed description of the drawings.

Figure 8:
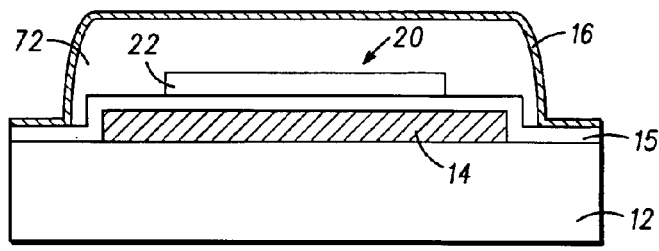

Referring to FIG. 8, once the nano-supported catalyst layer 22 has been formed within the emitter well 20 (see FIG. 4) with one of the previously described methods of the present invention, a second sacrificial layer 72 is deposited and patterned so as to substantially surround the emitter well 20. The second sacrificial layer 72 is formed with a depth and width that defines a gate separation from the emitter well 20, as will be subsequently described in more detail. The second sacrificial layer 72 is preferably formed of photo-resist to provide ease in removal, but could be Silicon-On-Glass (SOG), polyimide (P1), Q-pac or the like. The material forming the second sacrificial layer 72 is preferably configured to provide protection for the nano-supported catalyst layer 22 during deposition, patterning, etching or otherwise removing and cleaning and preferably minimize removal of the conductive layer 14 and/or the bleed layer 15.

After the second sacrificial layer 72 is formed, a gate seed layer 16 is deposited on the surface of the second sacrificial layer 72. Generally, the gate seed layer 16 is deposited with any number of processes, such as evaporation, ceramic printing, or the like, to produce a layer with a thickness that is greater than approximately one half (0.5) a micron and less than approximately two (2) microns. The gate seed layer 16 can include titanium, tungsten, or chromium and also include copper to improve electrical conduction during subsequent electroplating activities. The second sacrificial layer 72 is preferably formed with generally rounded corners such that the gate seed layer 16 can be evaporated onto the surface of the second sacrificial layer 72 with substantial uniformity over the surface. If the sides of second sacrificial layer 72 are too steep, breaks in the gate seed layer 16 can form and later plating applications may not form a substantially uniform layer.

Figure 9:
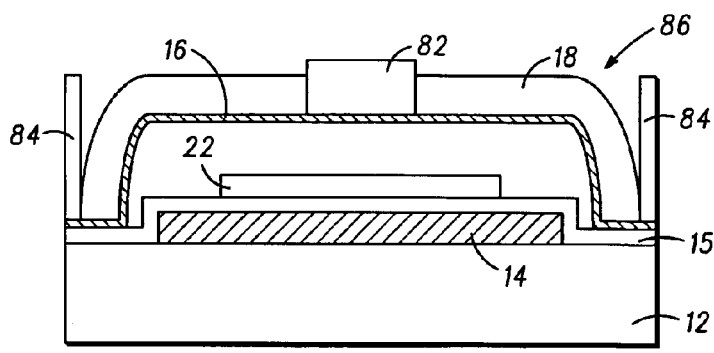

Referring to FIG. 9, a mask is formed on the gate seed layer 16 to define a gate opening 82 and gate edges 84. In this preferred exemplary embodiment of the present invention, a layer of photo-resist is applied across the majority and preferably substantially all or the entire structure and then patterned and removed to leave only a portion defining the gate opening 82 and the gate edges 84. However, is should be understood that that other mask materials may be used, such as oxides, nitrides and the like.

With the mask in place, a gate layer 18 is plated onto the exposed surface of the gate seed layer 16. The gate layer 18 can be any number of conductive materials, such as copper. The material of the gate layer 18 is preferably electroplated to form a gate or dome shape over the structure with a thickness that is preferably in a range of approximately five (5) microns to approximately fifteen (15) microns. However, the thickness may vary depending on the desired application. The gate layer 18 combines with gate seed layer 16 to form a substantially continuous gate 86. It will be understood, however, that other deposition methods, such as vacuum deposition, thermal spray, etc. could be used in accordance with the present invention with other conductive materials or metals.

When the cathodes are preferably fabricated into an array, the photo-resist defining the gate edges 84 separates the electroplated material into multiple strips formed in a parallel and spaced-apart relationship that are generally perpendicular to the strips formed in the conductive layer 14. In this preferred embodiment, both the strips formed in the conductive layer 14 and the substantially continuous gate 86 are preferably separated by a distance that is greater than about ten (10) microns. This separation reduces row to column capacitance, probability of shorting and leakage paths between conductors, and provides a vacuum dielectric, which will substantially reduce degradation due to electron bombardment.

Once the deposition of the gate layer 18 is completed, the mask is removed and the gate seed layer 16 is etched to form a gate opening 82 through the substantially continuous gate 86. The gate seed layer 16 can be a material that differs from gate layer 18 (e.g., titanium and copper, respectively) so that it can be selectively etched or a portion of gate layer 18 may be allowed to etch. Also, portions of gate seed layer 16 that are present between adjacent strips are preferably removed so that an electrical separation is provided between adjacent strips.

Figure 10:
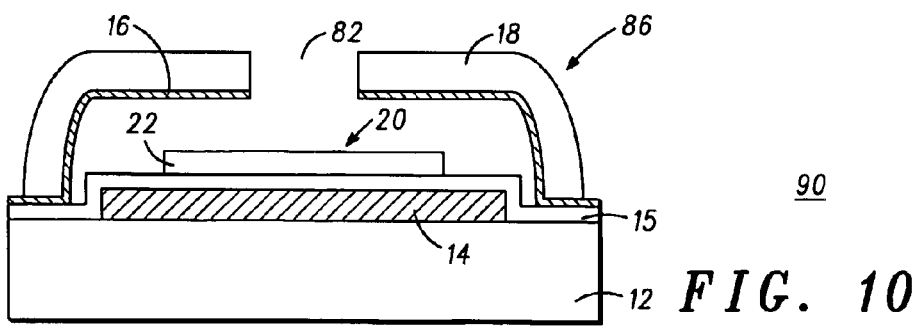

Referring to FIG. 10, the sacrificial layer 72 is removed to leave the gate 86 suspended over the emitter well 20. Upon removal of the sacrificial layer 72, the structure 90 shown in FIG. 10 is introduced into a vacuum chamber where nanotubes 24, preferably carbon nanotubes, are grown on the surface of the nano-supported catalyst layer 22 with a chemical reaction process such as a catalytic decomposition, pyrolysis, or chemical vapor deposition (CVD), and preferably hot filament chemical vapor deposition (HFCVD). The techniques required for conducting these processes are known in the art.

As can be appreciated by one of ordinary skill in the art, the nanotube growth temperature of the substrate during the chemical reaction process is a function of the substrate. For example, the nanotube growth temperature of a substrate of borosilicate glass is preferably less than about six hundred and fifty degrees Celsius (650° C.), more preferably less than about six hundred degrees Celsius (600° C.), even more preferably less than about five hundred and fifty degrees Celsius (550° C.), and most preferably less than about five hundred degrees Celsius (500° C.). As one of ordinary skilled in the art can appreciate, the nanotube growth temperature of other suitable substrates may be higher than about six hundred and fifty degrees Celsius (650° C.).

As previously indicated in this detailed description of the drawings, a HFCVD process is preferably used to grow carbon nanotubes 24 on the nano-supported catalyst layer 22. The preferred HFCVD process begins with the introduction of the structure 90 into a CVD growth chamber. A refractory metal filament (e.g., tungsten, platinum, rhenium, tantalum) is heated to a temperature above about nineteen hundred degrees Celsius (1900° C.) in a vacuum or as molecular hydrogen is flowed over the refractory metal filament. Carbon containing gases such as methane, acetylene, and xylene can also be flowed over the filament to provide a carbon source for the nanotube growth.

More specifically, the structure 90 is placed into a thermally conducting substrate holder (e.g., graphite) that is placed in a predefined location with respect to the hot filament (e.g., below the hot filament). The substrate holder can be a heater or it can be thermally connected to a heater. This configuration of the structure 90 and the hot filament allows the temperature of the substrate (i.e., the nanotube growth temperature) to be independently controlled from the hot filament temperature. During the growth of at least one carbon nanotube and more preferably multiple carbon nanotubes 24 on the nano-supported catalyst layer 22 of the structure 90, the distance between the hot filament and the field emission substrate 12 of the structure 90 is also controlled to provide a temperature of the substrate (i.e., the nanotube growth temperature). For example, a distance of about one-half to about two centimeters (about 0.5 cm to about 2 cm) between the hot filament and the substrate 12 is provided for a nanotube growth (or substrate) temperature ranging from about three hundred and fifty degrees Celsius (350° C.) to about six hundred degrees Celsius (600° C.).

Figure 11:
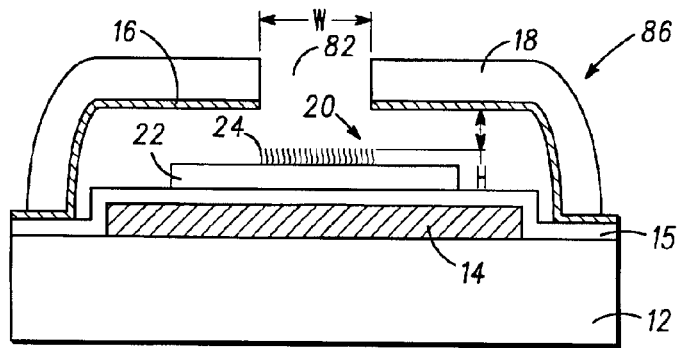

Once the desired nanotube growth temperature is provided on the field emission substrate 12, a carbon source is introduced into the CVD growth chamber. Any hydrocarbon or carbon-compound (e.g., methane, carbon monoxide, etc.) can be used as the carbon source. For example, a gas mixture of hydrogen ($H_2$) and methane ($CH_4$) can be used as the hydrocarbon source, with a flow rate of one hundred (100) standard cubic centimeters per minute (sccm) for hydrogen and forty (40) sccm for methane. The methane is diluted by the hydrogen and thermally disassociated and activated with the hot filament. The ratio of the methane to hydrogen is preferably maintained with the range of approximately twenty percent (20%) to approximately forty percent (40%) and the pressure of the CVD growth chamber is maintained at about twenty (20) to about fifty (50) Torr. The substantially simultaneous production of atomic hydrogen during hydrocarbon pyrolysis enhances the deposition of the carbon nanotubes 24. Referring to FIG. 11, the formation of the nanotubes 24 is terminated when their tips reach the level of the gate aperture, which also completes the formation of the cathode.

Referring to FIG. 11 and as previously described in this detailed description of the drawings, the sacrificial layer 72 shown in FIG. 8 is formed with a depth and width that defines a gate separation from the emitter well 20. While some scaling is possible (e.g., changes in anode operating potential may include changes in emitter-gate spacing, etc.), the sacrificial layer 72 shown in FIG. 8 is formed with a height (H) from the emitter well 20 and a gate opening width (W). In a specific example, the height (H) 81 can be approximately twelve (12) microns and the width (W) 83 can be approximately twenty (20) microns. Generally, it has been found that the thickness and height (H) of the gate 86 and the width (W) of the gate opening 82 are related to device performance and preferably are proportionally maintained in accordance with the present invention. Also, the height (H) is configured for a vacuum space from the nanotubes 24 or the field emission substrate 12 that provides a desired dielectric strength by way of a vacuum gap.

Figure 12:
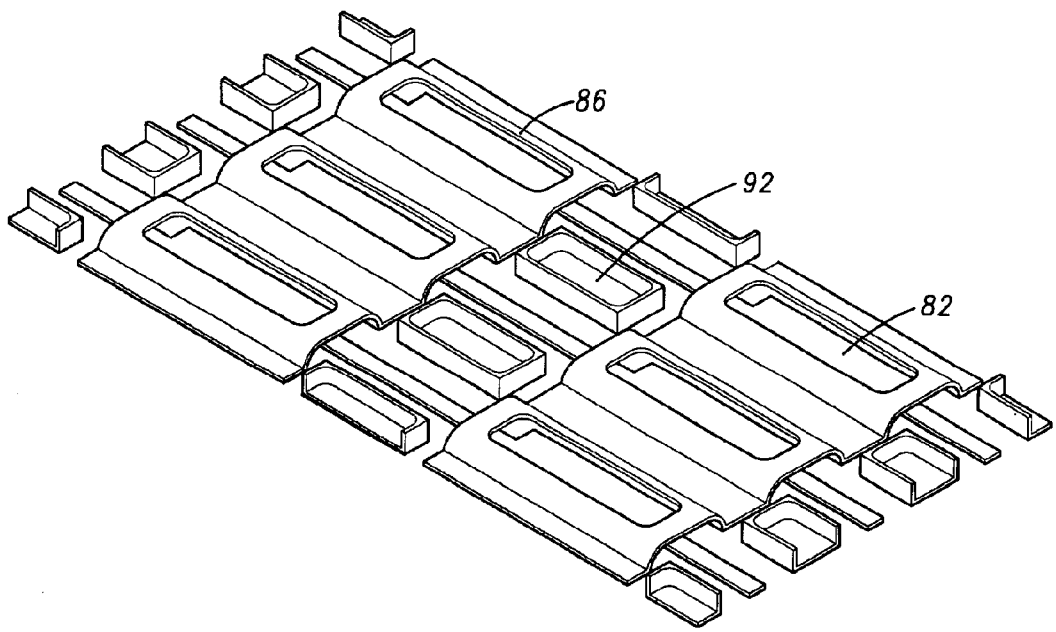
FIG. 12 is a top isometric view illustrating an array of the portion of the cathodes formed according to the preferred exemplary embodiment of the present invention.
Figure 13:
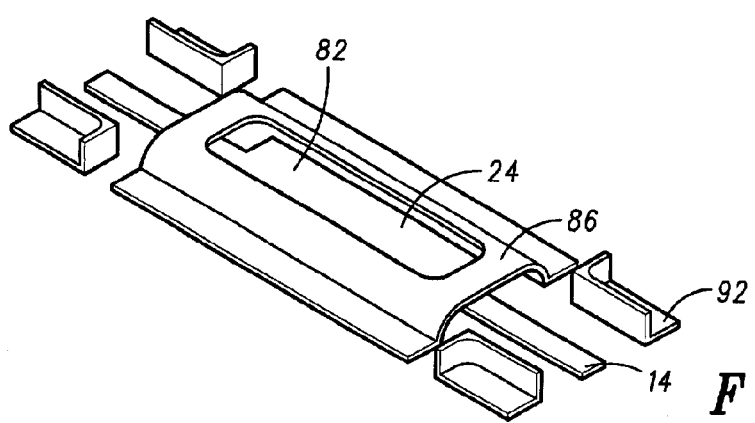
FIG. 13 is an enlarged view of a portion of FIG. 12.

With the assistance of the nano-supported catalyst layer 22, the nanotubes 24 are selectively and sparsely grown with a micro-pattern (i.e., sub-pixel or quantum dots). The nanotubes 24 are preferably single wall nanotubes or multi-walled nanotubes having a substantially uniform structure. The nanotubes 24 formed according to the present invention preferably have a diameter less than about twenty nanometers (20 nm), more preferably less than about ten nanometers (10 nm), and most preferably less than about three nanometers (3 nm). In addition, the nanotubes 24 formed according to the present invention preferably have an aspect ratio, defined as height of the nanotube to the width of the nanotube, that is greater than about one hundred and forty (140), but less than about four thousand and five hundred (4,500), more preferably greater than about one thousand (1,000), and most preferably greater than about one thousand (1,000) but less than about three-thousand and five hundred (3,500) with a substantially perpendicular orientation with respect to the surface of the substrate 12. The nanotubes 24 also preferably have a significant dispersion in that the spacing between the nanotubes 24 is between about twenty nanometers (20 nm) to about two thousand nanometers (2,000 nm). A top plan view and an isometric view of a portion of an array of cathodes are illustrated in FIGS. 12 and an enlarged view of FIG. 12 is provided in FIG. 13. As can be seen in FIGS. 12 and 13, spacer mounting pads 92 are illustrated that are formed between adjacent rows of gates 86 to assist in maintaining a relatively fixed relationship between the anodes 13 and the gates 86.

Figure 14:
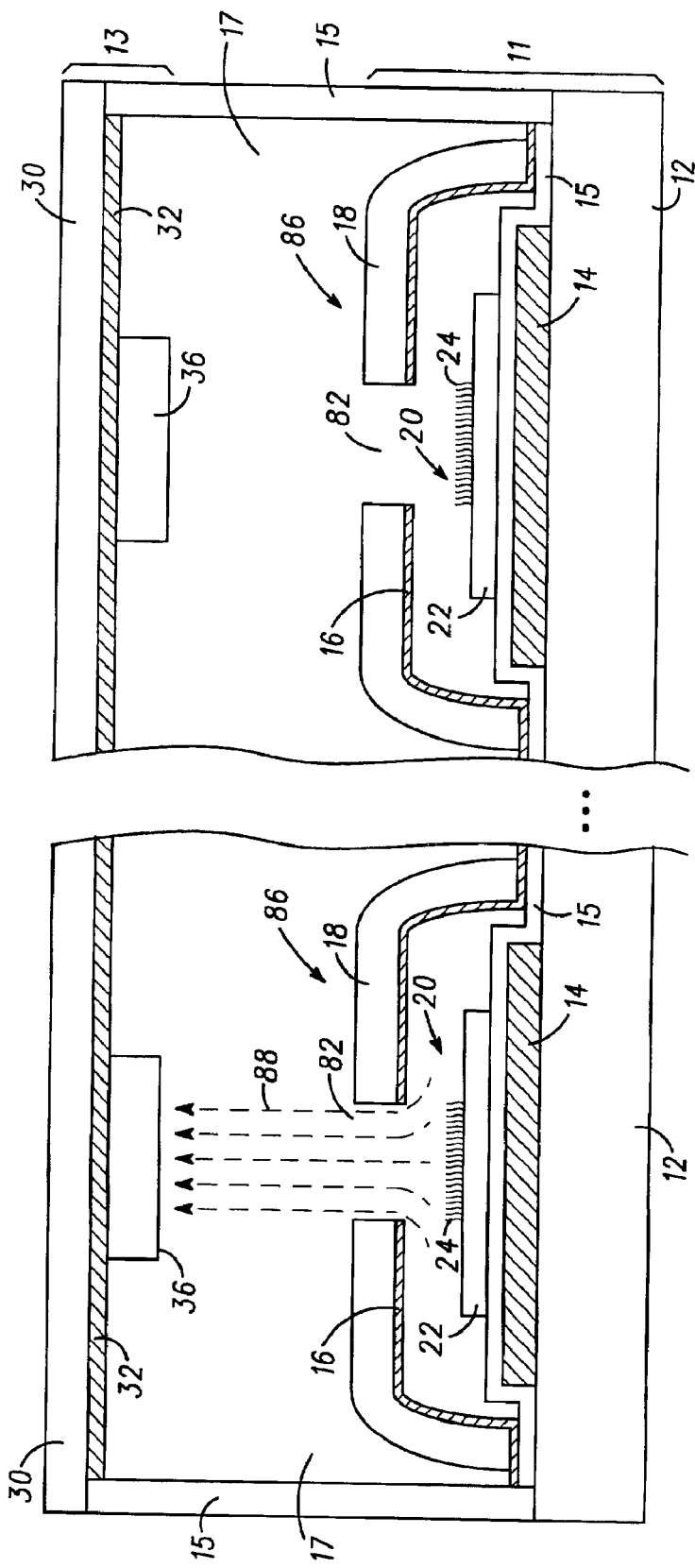
FIG. 14 is a field emission display constructed according to a preferred exemplary embodiment of the present invention.

Referring to FIG. 14, the formation of a FED, having cathodes formed according to the present invention preferably continues with the formation of anodes 13 in a spaced relation from the gates 86. The anodes 13 are formed by providing a substrate 30 upon which is deposited a transparent conductive layer 32 such as indium tin oxide (ITO). The substrate 30 can be the same material or similar material as the field emission substrate 12. Multiple cathodoluminescent deposits 36 are formed on the transparent conductive layer 32 in alignment with the gate opening 82 in the gates 86. The anodes 13 are preferably spaced approximately two hundred and fifty (250) microns to five thousand (5,000) microns from the substrate 12. The formation of the FED 10 is completed when the field emission substrate 12 with cathodes 11 and the substrate 30 with anodes 13 are sealed around a frame 15 with a vacuum that is preferably less than $1 \times 10^{-6}$ Torr.

The frame 15 is configured for placement between the cathodes 11 and anodes 13 at the peripheries to provide standoff there between and thereby define an interspace region 17. The cathodes 11 have the field emission substrate 12, the conductive layer 14, the gate seed layer 16, the gate layer 18, and the emitter well 20. The bleed layer 15 over the conductive layer 14 can also be optionally included in accordance with the present invention. The emitter well 20 contains the nano-supported catalyst layer 22 over the conductive layer 14, and the nanotubes 24 are grown on the nano-supported catalyst layer 22 as previously described in this detailed description of the drawings. The anodes 13 have the substrate 30 that is spaced from the gate layer 18, a transparent conductive layer 32, and a cathodoluminescent deposit 36 formed on the transparent conductive layer 32. The interspace region 17 is evacuated to a pressure of about $1 \times 10^{-6}$ Torr.

The operation of FED 10 includes applying suitable potentials at the conductive layer 14, gate layer 18 and transparent conductive layer 32 for extracting electrons from selectively addressed nanotubes 24 and causing the electrons to traverse out of the corresponding emitter wells 20, across interspace region 17, to be received by cathodoluminescent deposits 36, thereby causing them to emit light. In a preferred embodiment of the present invention, a potential of approximately several thousand volts is applied to the anodes 13. The gate 86 has two operating modes or potentials. In a first mode, the electric field applied on the anode 13 is sufficient to extract electrons from the emitters 24. To turn the device on and extract electrons, the gate potential applies a gate field, which is about equal to or larger than the anode field. To turn the device off and eliminate the flow of electrons, the gate potential applies a field that is either significantly smaller than the anode field or the opposite polarity of the anode field. The gate potential in the first mode produces alignment of electron extraction electric field lines 88. Since electrons are generally emitted from the nanotubes 24 in a generally perpendicular direction with respect to the conductive layer 14, only a relatively small amount of focusing can be used to correct for stray electrons or spreading of the beam. In a second mode, the electric field applied by the anodes is insufficient to extract electrons from the emitters 24. To turn the device on, a gate potential is applied to create a gate field sufficient to extract electrons from the electron emitters. To turn the device off, a smaller gate potential is applied, which is insufficient to extract electrons from the emitters 24.

The FED 10 constructed according to the present invention can have a triode geometry from about one-tenth of a micron (0.10 $\mu$m) to about twenty-five microns (25 $\mu$m); a gate spacing less than about twenty-five microns (25 $\mu$m); a switching voltage that is preferably less than about eighty (80) volts and more preferably less than about fifty (50) volts with a cathode current preferably greater than about one half milliamp per square centimeter (0.5 mA/cm$^2$), more preferably greater than one and one half milliamps per square centimeter (1.5 mA/cm$^2$); and a lifetime performance of greater than three thousand (3,000) hours. The switching voltage of FED 10 is dependent upon the diameter and the aspect ratio of the nanotubes 24.

It is preferable to construct the FED 10 such that the device switches with the desired field emission current density at low switching voltages that is less than about eighty volts (80 V) and more preferably less than about fifty volts (50 V). This provides an FED 10 configuration that enables the use of low voltage driver electronics for switching current densities of approximately one milliamp per square centimeter (1 mA/cm2) and also current densities that exceed one ampere per square centimeter (1 A/cm2). It is also preferable to provide the FED 10 with the low switching voltage using inexpensive device processing techniques, such as the device processing techniques described in this detailed description of the drawings, and the FED 10 is also preferably designed with specific combinations of gate electrode spacing, nanotube diameter, nanotube height, and nanotube density to provide the low switching voltage property.

The low voltage switching is typically achieved over a relatively narrow range of combinations for the gate electrode spacing, nanotube diameter, nanotube height and nanotube density. The specific combinations depend to some extent on the desired operating conditions for the FED. When the nanotubes have spacings that are approximately less that the height of the nanotubes, the switching field applied by the gate electrode is screened by adjacent nanotubes and electron extraction from the nanotube is less than efficient, which results in an increased switching voltage. This results in an undesirable increase in the switching voltage for approximately the same current. Therefore, the length of the nanotubes is preferably on the order of ten (10) micrometers or less in order to avoid field screening while achieving sufficient current density with about one million emitting nanotubes per square centimeter.

The switching voltage for a given combination of device geometry, nanotube height, nanotube diameter and nanotube spacing can be predicted from field emission theory in combination with electric field modeling. However, the general procedure can be outlined with a simplified model, which produces results that are adequate to define the useful range of geometrical and nanotube dimensions for a low voltage switching. An example electrode geometry that illustrates the switching voltage requirements is a cathode plate with a single protruding nanotube having a height (h), an anode plate spaced a distance (d), which is greater than the height (h) from the cathode plate. Both the cathode and anode plates extend too much greater distances in a plane perpendicular to the nanotube.

This example geometry is a simplified structure solely for the purpose of illustrating the switching voltage and does not contain an anode electrode. However, the geometry is similar to that of the preferred embodiment of the present invention with a gate electrode having an aperture at a location proximate to the nanotube, and an anode electrode positioned above the gate electrode. The electric fields and voltages are similar for the simplified example and the preferred embodiment of similar dimensions. In the example geometry, the nanotube does not have a height greater than the spacing distance (d). However, an increase in the height of the nanotube decreases the switching voltage. In the preferred embodiment of the present invention having the gate electrode with the aperture, the nanotube can extend to a distance (d) and the aperture diameter is about d/2 so that the nanotube is spaced from the electrode by about d/2. Similar computational results are obtained in the simplified example geometry for a height (h) of d/2. Practically, it is difficult to control the geometry with a good yield when the height (h) is greater than about one half (0.5) of the distance (d). Consequently, a practical geometrical configuration for this illustrative example based on fabrication procedures is a height (h) of d/2 with yields about equal to the lowest practical switching voltage.

The swing voltage increases with the diameter of the nanotube. For nanotubes with a diameter greater than about twelve (12) nm in the example geometry, the switching voltage exceeds eighty volts (80 V). However, devices using nanotubes with diameters less than about five nanometers (5 nm) nanometers can switch the desired current with a voltage that is less than about fifty volts (50 V). While a device can be configured with a nanotube size and geometry that allows a field emission device to operate with a switching voltage less than eighty volts (80 V), a nanotube diameter that is less than about twenty nanometers (20 nm) would be typical for the device. More generally, the nanotube diameter for a device that switches the desired current density with manufacturable geometries using less than about eighty volts (80 V) has a nanotube diameter that is substantially less than about twelve nanometers (12 nm).

This example also illustrates that relationship of the nanotube aspect ratios (i.e., nanotube height divided by nanotube diameter) for a field emission device with a low switching voltage. For example, the aspect ratio of nanotubes with about twelve nanometer (12 nm) diameters is preferably greater than about two hundred (200) for an electrode spacing of approximately five (5) micrometers, about four hundred (400) for an electrode spacing of approximately ten (10) micrometers, and about eight hundred (800) for an electrode spacing of approximately twenty (20) micrometers. Likewise, the aspect ratio of nanotubes with smaller diameters such as two nanometers (2 nm) is approximately greater than about twelve hundred and fifty (1250) for an electrode spacing of five (5) micrometers and about two thousand five hundred (2500) for an electrode spacing of about ten (10) micrometers, and about five thousand (5000) for an electrode spacing of approximately twenty (20) micrometers.

As previously described in this detailed description of the drawings, the FED 10 is preferably constructed to obtain a low switching voltage and preferably constructed to have a gate electrode to cathode plane spacing ranging from about one-tenth of a micron (0.10 µm) to about twenty-five microns (25 µm). For low cost processing, it is desirable to use a gate electrode to cathode plane spacing ranging between about five microns (5 µm) to about twenty-five microns (25 µm). In a most preferred embodiment of the present invention, it is desirable to construct the FED 10 with about a ten (10) micrometer gate to cathode spacing, incorporating greater than one million emitting nanotubes per square centimeter of cathode area with the emitting nanotubes having diameters of approximately two nanometers (2 nm) to five nanometers (5 nm), heights of approximately three (3) to five (5) micrometers, and the spacing between emitting nanotubes at least approximately three (3) to five (5) micrometers. These conditions are sufficient to switch more than 1 mA/cm2 of current with less than 80 V.

From the foregoing description, it should be appreciated a low gate voltage FED and methods of forming a low gate voltage FED are provided with present significant benefits, which are described in the background of the invention and the detailed description of preferred exemplary embodiments, and also would be apparent to one skilled in the art. Furthermore, while preferred exemplary embodiments have been presented in the foregoing description of preferred exemplary embodiments, it should be appreciated that a vast number of variations in the embodiments exist. Lastly, it should be appreciated that these embodiments are preferred exemplary embodiments only, and are not intended to limit the scope, applicability, or configuration of the invention in any way. Rather, the foregoing detailed description provides those skilled in the art with a convenient road map for implementing a preferred exemplary embodiment of the invention. It being understood that various changes may be made in the function and arrangement of elements described in the exemplary preferred embodiments without departing from the spirit and scope of the invention as set forth in the appended claims.

APPENDIX I

Example I

1. Immerse a borosilicate glass with a copper (Cu) metal pattern (i.e., substrate with an electrode) into a solution of $1 \times 10^{-2}$ M $Al(NO_3)_3$ in isopropyl alcohol (IPA) and apply a negative twenty volt (−20V) bias to the copper metal pattern while keeping a counter electrode, which can be constructed out of stainless steel, at ground for a duration of one (1) minute. The desired chemical reactions involved in this step are:

$Al(NO_3)_3 \rightarrow Al(NO_3)^{2+} + NO_3^-$ occurring in the solution;

$Al(NO_3)_2^+ + 30H^- \rightarrow Al(OH)_3 + 2NO_3^-$ occurring at the electrode; and $Al(OH)_3$ is the solid partial nano-supported catalyst that is forming at the electrode.

2. Dry the borosilicate glass with the copper metal pattern with the partially formed nano-supported catalyst with a fifteen (15) minute bake at eighty degrees Celsius (80° C.)

3. Immerse the borosilicate glass with the copper metal pattern with the partially formed nano-supported catalyst into a solution of $1 \times 10^{-3}$ $Fe(NO_3)_3 \cdot 9H_2O$ M (iron(III)nitrate hydrate) in IPA and apply a negative five volt (−5V) bias to the copper metal pattern while keeping a counter electrode at ground for a duration of about one (1) minute. The desired chemical reactions involved in this step are:

$Fe(NO_3)_3 \rightarrow Fe(NO_3)_2^+ + NO_3^-$ occurring in solution;

$Fe(NO_3)^+ + 30H^- \rightarrow Fe(OH)_3 + 2NO_3^-$ and $Fe(NO_3)^{+2} + 30H^- \rightarrow Fe(OH)_3 + NO_3^-$ occurring at the electrode; and $Fe(OH)_3$ is the solid partial nano-supported catalyst that is forming at the electrode.

4. Dry the borosilicate glass with the copper metal pattern having the nano-supported catalyst formed of $Al_2O_3/FeO_x$ with a fifteen (15) minute bake at eighty degrees Celsius (80° C.).

5. Perform hot filament chemical vapor deposition (HFCVD) growth at five hundred and eighty degrees Celsius (580° C.) with rhenium filament, and a gas mixture of methane ($CH_4$) and hydrogen ($H_2$) at a four to one ratio for thirty (30) minutes.

6. The resulting carbon nanotube layer can be best described as a tangled carpet of carbon nanotubes with diameters on the order of about one nanometer (1 nm) to about three nanometers (3 nm) and an aspect ratio of ranging from one thousand (1,000) to 2,000).

Example II

1. Immerse a borosilicate glass with a copper (Cu) metal pattern (substrate with an electrode) into a solution with $1\times10^{-2}$ M Mg(NO$_3$)$_2$ in isopropyl alcohol (IPA) and apply negative twenty volts (−20V) to the copper metal pattern while keeping a counter electrode, which can be constructed out of stainless steel, at ground for a duration of one (1) minute. The desired chemical reactions involved in this step are:

Mg(NO$_3$)$_2$→Mg(NO$_3$)$^+$+NO$_3^-$ occurring in the solution;

Mg(NO$_3$)$^+$+2OH$^-$→Mg(OH)$_2$+NO$_3^-$ occurring at the electrode; and

Mg(OH)$_2$ is the solid partial nano-supported catalyst that is forming at the electrode.

2. Dry the borosilicate glass with the copper metal pattern having the partially formed nano-supported catalyst with a fifteen (15) minute bake at eighty degrees Celsius (80° C.)

3. Immerse the borosilicate glass with the copper metal pattern having the partially formed nano-supported catalyst into a solution of $1\times10^{-3}$ Fe(NO$_3$)$_3$·9H$_2$O M (iron(III)nitrate hydrate) in IPA and apply a negative five volt (−5V) bias to the copper metal pattern while keeping a counter electrode at ground for a duration of one (1) minute. The desired chemical reactions involved in this step are:

Fe(NO$_3$)$_3$→Fe(NO$_3$)$_2^+$+NO$_3^-$ occurring in solution;

Fe(NO$_3$)$^+$+3OH$^-$→Fe(OH)$_3$+2NO$_3^-$ and Fe(NO$_3$)$^{+2}$+3OH$^-$→Fe(OH)$_3$+NO$_3^-$ occurring at the electrode; and Fe(OH)$_3$ is the solid partial nano-supported catalyst that is forming at the electrode.

4. Dry the borosilicate glass with the copper metal pattern with the formed nano-supported catalyst of Mg$_2$O$_2$/FeO$_x$ with a fifteen (15) minute bake at eighty degrees Celsius (80° C.).

5. Perform hot filament chemical vapor deposition (HFCVD) growth at six hundred degrees Celsius (600° C.) with rhenium filament, and a gas mixture of methane (CH$_4$) and hydrogen (H$_2$) at a four to one ratio for thirty (30) minutes.

Example III

1. Immerse a borosilicate glass with a copper metal pattern (substrate with an electrode) into a solution with $1\times10^{-2}$ M Al(NO$_3$)$_3$ plus $1\times10^{-3}$ Fe(NO$_3$)$_3$·9H$_2$O M in isopropyl alcohol (IPA) and apply a negative ten volt (−10V) bias to the copper metal pattern while keeping a counter electrode, which can be constructed out of stainless steel, at ground for a duration of one (1) minute. The desired chemical reactions involved in this step are:

Al(NO$_3$)$_3$→Al(NO$_3$)$^{2+}$+NO$_3^-$ and Fe(NO$_3$)$_3$→Fe(NO$_3$)$_2^+$+NO$_3^-$ occurring in the solution;

Al(NO$_3$)$_2^+$+3OH$^-$→Al(OH)$_3$+2NO$_3^-$, Fe(NO$_3$)$^+$+3OH$^-$→Fe(OH)$_3$+2NO$_3^-$ and Fe(NO$_3$)$^{+2}$+3OH$^-$→Fe(OH)$_3$+NO$_3^-$ occurring at the electrode; and Al(OH)$_3$ and Fe(OH)$_3$ are the solid nano-supported catalyst that is forming at the electrode.

2. Dry the borosilicate glass with the copper metal pattern with the formed nano-supported catalyst of Al$_2$O$_3$/FeO$_x$ with a fifteen (15) minute bake at eighty degrees Celsius (80° C.).

3. Perform hot filament chemical vapor deposition (HFCVD) growth at six hundred degrees Celsius (600° C.) with rhenium filament, and a gas mixture of methane (CH$_4$) and hydrogen (H$_2$) at a four to one ratio for thirty (30) minutes.

Example IV

1. Individual nickel and aluminum sources, both are 99.9% pure, are deposited through a polymer mask (i.e., PMMA) by electron-beam co-evaporation onto molybdenum photo-resist patterned substrate (i.e. borosilicate glass with a molybdenum electrode) to form an one hundred and fifty nanometers (150 nm) thick patterned mixed metal alloy layer consisting of fifty percent (50%) nickel and fifty percent (50%) aluminum onto substrate.

2. The photo-resist on the substrate is removed by dissolution in acetone and the mixed metal alloy layer of the prescribed pattern remained on the substrate.

3. The substrate with the patterned mixed alloy layer is immersed for five (5) minutes into a solution containing NH$_4$OH, H$_2$O$_2$, and H$_2$O in the ratio of one to one to five (1:1:5) respectively at a temperature of forty Celsius (40° C.) with the desired chemical reaction of Al+3NH$_4$OH→Al(OH)$_3$+NH$_4^+$ occurring in the mixed metal alloy film to form a Ni—Al nano-supported sponge catalyst. The Al(OH)$_3$ is the metal oxide nano-support structural element of the Ni—Al nano-supported sponge catalyst.

4. Dry the substrate with the patterned Ni—Al nano-supported sponge catalyst by baking it at eighty degree Celsius (80° C.) for fifteen (15) minutes.

5. Perform hot filament chemical vapor deposition (HFCVD) growth at five hundred and eighty degrees Celsius (580° C.) with rhenium filament, and a gas mixture of methane (CH$_4$) and hydrogen (H$_2$) at a four to one ratio for thirty (30) minutes.

Example V

1. Prepare a nanocatalyst solution containing 0.1 grams Fe(N03)3.9H20, 0.03 grams of molybdenyl acetylacetonate, 75 ml water, and 0.75 of nanoparticle alumina or silica that is mixed for about twenty four hours and sonicated for about one hour.

2. Prepare a borosilicate glass substrate with metallization and a removable photo patterned layer that contains openings at desired nanotube locations.

3. Disperse the nanocatalyst solution onto the photo patterned layer and dry the solution at eighty-five degrees Celsius.

4. Conduct the formation of the field emission device structure.

5. Perform hot filament chemical vapor deposition (HFCVD) growth at five hundred and eight degrees Celsius with a rhenium filament and a gas mixture of methane and hydrogen at a four to one ratio for approximately thirty minutes.

What is claimed is:

1. A field emission device including an anode and a cathode, said cathode comprising;

a substrate having a deformation temperature that is less than about six hundred and fifty degrees Celsius;

a nano-supported catalyst formed on said substrate, said nano-supported catalyst having active catalytic particles that are less than about five hundred nanometers in diameter, the nano-supported catalyst comprising:

a non-porous sub-layer, overlying the substrate, having said active catalytic particles and a structural metallic element; and a porous sub-layer, overlying the non-porous sub-layer, having said active catalytic particles supported by a metal oxide structure; and a plurality of nanotubes that are catalytically formed in situ on said nano-supported catalyst, each of said plurality of nanotubes having a diameter that is less than about twenty nanometers and configured to provide a switching voltage for triggering nanotube emission that is less than about eighty volts so that a nanotube emission current density drawn from said field emission device is greater than about one-half milliampere per squared centimeter of said anode.

2. The field emission device of claim 1, wherein said plurality of nanotubes that are catalytically formed in situ on said nano-supported catalyst is catalytically formed in situ on said nano-supported catalyst with hot filament chemical vapor deposition (HFCVD).

3. The field emission device of claim 1, wherein said switching voltage is less than about fifty volts.

4. The field emission device of claim 1, wherein said active catalytic particles are less than about fifty nanometers in diameter.

5. The field emission device of claim 1, wherein said diameter of said nanotube is less than about five nanometers.

6. The field emission device of claim 1, wherein each of said nanotubes has an aspect ratio of greater than approximately one hundred and forty and less than approximately four thousand and five hundred.

7. The field emission device of claim 1, wherein each of said nanotubes are single-wall nanotubes.

8. The field emission device of claim 1, wherein each of said nanotubes are multi-wall nanotubes.

9. The field emission device of claim 1, wherein said current density drawn from said field emission device is greater than about one and one-half milliamp per squared centimeter.

10. The field emission device of claim 1, wherein said substrate comprises at least one material selected from the group consisting of borosilicate glass, sodalime glass, carbon, silicon, ceramics, metals, and composite materials.

11. The field emission device of claim 1, wherein said field emission device is configured to provide a gate spacing of less than about twenty-five microns.

12. The field emission device of claim 1, wherein a second distance between said anode and said substrate is greater than about two hundred and fifty microns and less than about five thousand microns.

13. The field emission device of claim 1, wherein a thickness of said nano-supported catalyst is less than one micron.

14. The field emission device of claim 1, wherein said nano-supported catalyst is comprised of said active catalytic particles that are selected from the group consisting of iron, nickel, cobalt and a metal oxide selected from the group consisting of alumina, silica and magnesium oxide.

15. The field emission device of claim 1, wherein said porous sub-layer has a surface area to volume ratio of greater than about fifty meter square per gram (50 m$^2$/g).

* * * * *